UNITED STATES PATENT OFFICE.

CARL NEUBERG, OF CHARLOTTENBURG, GERMANY.

PROCESS OF PRODUCING DIGESTIBLE SUBSTANCES FROM KERATIN.

No. 926,999.  Specification of Letters Patent.  Patented July 6, 1909.

Application filed November 25, 1907. Serial No. 403,790.

*To all whom it may concern:*

Be it known that I, CARL NEUBERG, chemist, a citizen of Germany, residing at 12 Grolmannstrasse, Charlottenburg, near Berlin, in the Kingdom of Prussia and Empire of Germany, have invented a new Process for Producing Digestible Albumoses and Peptones from Keratin or Keratin Substances, of which the following is a specification.

The present invention refers to a process for producing digestible albumoses and peptones from keratin, substances resembling keratin and containing keratin (horny substances). Keratin, or substances resembling keratin or containing keratin occur in nature in large quantities as for instance in form of hairs, horns, nails, hoofs, claws, feathers, waste of sponges, epidermis, waste wool and the like and represent the waste products of various industries. While the actual protein bodies are generally digestible and can be therefore used without any further preparations as food stuffs for man and beasts, the keratin and the bodies resembling keratin and containing keratin are, as is well known, absolutely indigestible and cannot be employed as nutrients for man and almost all beasts, so that these waste products could not be very usefully employed until now. I have now found, that it is possible, to convert in a very simple manner the keratin into digestible albuminous substances and by such means to produce valuable nutritive substances from the almost useless keratin bodies. For this purpose the keratin or the substance resembling or containing keratin is treated at suitable temperature with mineral acids. The temperature and the time of action depends on the strength and the concentration of the acid, but always care must be taken that the disintegration or decomposition of the keratin caused by the action of the acid will not go too far and not be too intensive, that is to say that the first produced digestible albumoses and peptones are not further decomposed. For this purpose the acid may be let act only until the keratin has just disappeared perfectly or almost perfectly, and a diluted sample or separate portion of the reaction liquid after separation of the albumoses by addition of any convenient precipitant, as say phospho-tungstic acid, and removing the heavy precipitate thereby produced by filtration, will contain no essential quantity of amino acid nitrogen. For the presence of large quantities of amino acid in this filtrate would prove that the action of the acid has been too strong, as the amino acids represent the last or final products of decomposition of all protein substances. The temperature at which the process is carried out must also be moderate, generally below 100 degrees Cent.

Although processes for converting the actual albuminous substances into digestible albumoses and peptones by means of moderated hydrolysis were already known, it was not to be anticipated, that it would be possible, to transform the horny substances, (the keratin or bodies containing keratin) in the same manner into digestible nutrients. For in the previously made experiments for the decomposition of keratin and the like, the same was always too far converted; so for instance the sulfurous group (the so called cystin group) was removed.

For obtaining the desired decomposition of the keratin any mineral acid may be employed, as say sulfuric acid, thick, syrupy phosphoric acid, muriatic acid or the like. After the action of the mineral acids on the keratin or keratinous bodies the albumoses and peptones thereby produced are isolated by either precipitating the respective acids by suitable reagents and then separating the digestible albumoses and peptones by evaporation (if necessary in a vacuum), or by salting out the albumoses and peptones from the reaction liquid or throwing them down in form of insoluble precipitates, or also by extracting these products of reaction from the formed solution or the like. If the isolating of the albumoses and peptones is obtained by gaining them in form of salts, such salts of the digestible reaction products may be formed at once, which may be used without ado especially for pharmaceutical purposes, as for instance iron salts, silver salts and the like. In such a case the neutralization of the solution and the isolation of the produced albumoses and peptones may either be effected successively or simultaneously. The digestible albumoses and peptones thus produced are gained immediately in pretty good purity. Particularly the coloring matters, which are contained in the keratinous bodies of various origin, as for instance the coloring matter of the hairs, are completely thrown down in the precipitation of the acid, so that the digestible albumoses and peptones are directly obtained in almost or fully colorless state.

The process may be carried out, as an example, in the following detailed manner: 100 grams of feathers are chopped fine, and subjected to the action of 300 to 400 ccm. sulfuric acid of 50 to 60% at the ordinary temperature of a room. After 2 to 2½ days the keratin will have entirely or almost entirely disappeared. For testing that the reaction did not proceed too far, a sample of the reaction liquid is diluted until the concentration of the sulfuric acid is reduced to 5 to 10%, then this diluted liquid is if necessary filtered and a solution of phospho tungstic acid is added as long as there is yet formed any precipitate. This sediment is removed after a while by filtration, the sulfuric acid is precipitated from the filtrate by caustic baryta and the filtrate of the thus formed precipitate is evaporated until any ammonia odors which in some cases may appear have disappeared. The thus concentrated solution is tested in known manner for any contents of nitrogen. As the nitrogen of the albumoses and peptones has been removed by the phosphoric tungstic acid and any ammonia-nitrogen has been expelled by evaporation, the almost entirely negative result of this nitrogen test will prove that there are no considerable quantities of amino acid in the reaction liquid, that is to say, that the decomposition had not gone beyond the allowed limit.

In the above named time, 2 to 2½ days, the action of the acid will have proceeded to the desired extent. The dark colored reaction liquid is now diluted with water, the acid is neutralized with the necessary quantity of hydrate of baryta or carbonate of barium or with lime or carbonate of calcium, the thereby precipitated sulfate of barium or calcium is removed by filtration and the now quite colorless filtrate is evaporated *in vacuo*.

If the keratin is treated with the acid at a higher temperature the duration of the process must be accordingly shortened, say at a maintained temperature of 60 degrees to half an hour for the same acid, and if an acid of other concentration or strength is used both duration and temperature must be accordingly varied.

Having now described my invention what I claim and desire to secure by Letters Patent of the United States is:

1. A process for converting keratin or keratin substances into digestible albumoses and peptones which consists in subjecting keratin substances to the action of mineral acids for a time and at a temperature to transform the keratin until a diluted sample of the reaction liquid to which a precipitant for albumoses has been added after filtration shows no amino-acid-nitrogen, whereupon the formed albumoses and peptones are isolated.

2. A process for converting keratin or keratin substances into digestible albumoses and peptones which consists in subjecting keratin-like substances to the action of mineral acids for a time and at a temperature to transform the keratin but only until a diluted sample of the reaction liquid to which a precipitant for albumoses has been added shows after filtration and removal of ammonia no considerable quantities of nitrogen, then adding a precipitant to the reaction liquid of the main process and then removing the precipitate thereby produced.

3. A process for converting keratin or keratin substances into digestible albumoses and peptones which consists in subjecting keratin-like substances to the action of mineral acids for a time and at a temperature to transform the keratin until a diluted sample of the reaction liquid to which a precipitant for albumoses has been added shows after filtration and removal of ammonia no considerable quantities of nitrogen then adding a precipitant for the mineral acid to the reaction liquid of the main process, then removing the precipitate thereby produced and isolating the digestible albumoses and peptones by evaporation of the liquid.

4. A process for converting keratin or keratin substances into digestible sulfur containing albumoses and peptones which consists in subjecting keratin substances to the action of diluted mineral acids at a moderate temperature for a time sufficient to transform the keratin but only until a diluted sample of the reaction liquid to which phosphotungstic acid has been added after filtration, does not contain considerable quantities of amino acids, whereupon the formed albumoses and peptones of the main part of the reaction liquid are isolated.

5. A process for converting keratin or keratin substances into digestible albumoses and peptones which consists in subjecting the keratin or keratin substances to the moderate action of mineral acid for a time and at a temperature to transform the keratin until a diluted sample of the reaction liquid to which a precipitant for albumoses has been added after filtration shows no amino acid nitrogen whereupon the formed albumoses and peptones are isolated.

In testimony whereof I have hereunto set my hand in presence of two subscribing witnesses.

CARL NEUBERG.

Witnesses:
WOLDEMAR HAUPT,
HENRY HASPER.